United States Patent
Yoon (10) Patent No.: US 10,800,047 B2
(45) Date of Patent: Oct. 13, 2020

(54) ROBOT ARM MECHANISM AND ROTARY JOINT APPARATUS

(71) Applicant: LIFE ROBOTICS INC., Tokyo (JP)

(72) Inventor: Woo-Keun Yoon, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 196 days.

(21) Appl. No.: 16/147,388

(22) Filed: Sep. 28, 2018

(65) Prior Publication Data

US 2019/0030734 A1    Jan. 31, 2019

Related U.S. Application Data

(63) Continuation of application No. PCT/JP2017/012209, filed on Mar. 26, 2017.

(30) Foreign Application Priority Data

Mar. 29, 2016 (JP) ................. 2016-066897

(51) Int. Cl.
| | |
|---|---|
| *B25J 18/02* | (2006.01) |
| *B25J 17/02* | (2006.01) |
| *F16H 19/06* | (2006.01) |

(52) U.S. Cl.
CPC ......... *B25J 18/025* (2013.01); *B25J 17/0258* (2013.01); *B25J 18/02* (2013.01);
(Continued)

(58) Field of Classification Search
CPC ...... B25J 18/025; B25J 17/0258; B25J 18/02; F16H 19/0636; F16H 19/0645; F16H 19/0663
See application file for complete search history.

(56) References Cited

U.S. PATENT DOCUMENTS

| | | | | |
|---|---|---|---|---|
| 4,784,014 A | * | 11/1988 | Bruns | B25J 9/1025 74/640 |
| 4,846,015 A | * | 7/1989 | Keppler | B25J 9/102 74/665 GC |

(Continued)

FOREIGN PATENT DOCUMENTS

| | | |
|---|---|---|
| CN | 104802164 A | 7/2015 |
| CN | 104908031 A | 9/2015 |

(Continued)

OTHER PUBLICATIONS

International Search Report issued in PCT/JP2017/012209 dated Jun. 13, 2017 with English Translation (6 pages).
(Continued)

*Primary Examiner* — David M Fenstermacher
(74) *Attorney, Agent, or Firm* — Nakanishi IP Associates, LLC (57) ABSTRACT

An up/down section 4 of a robot arm mechanism includes: a pair of side frames disposed on a rotating section of a turning rotary joint; a cylindrical body supported in an axially rotatable manner by the side frames; a motor unit including a motor and a gearbox for rotationally driving the cylindrical body; connecting sections for connecting with an arm support body that movably supports an arm section; and a guide structure for guiding second pieces that were separated from first pieces into a columnar support section. The motor unit, connecting sections and guide structure are integrated with the cylindrical body. The motor unit is housed inside the cylindrical body, and an output shaft of the motor unit is connected to one of the side frames. The connecting sections are fixed to the outer circumferential surface of the cylindrical body. The guide structure is an annular body provided on the outer circumferential surface of the cylindrical body.

4 Claims, 8 Drawing Sheets

(52) U.S. Cl.
CPC ..... *F16H 19/0636* (2013.01); *F16H 19/0645* (2013.01); *F16H 19/0663* (2013.01)

(56) References Cited

U.S. PATENT DOCUMENTS

| | | | | |
|---|---|---|---|---|
| 5,293,107 A * | 3/1994 | Akeel | ........................ | B25J 9/08 310/83 |
| 5,355,743 A * | 10/1994 | Tesar | ........................ | B25J 9/08 475/149 |
| 5,523,662 A | 6/1996 | Goldenberg et al. | | |
| 6,084,373 A * | 7/2000 | Goldenberg | ............... | B25J 9/08 318/568.11 |
| 7,971,504 B2 * | 7/2011 | Haniya | ................. | B25J 9/0087 74/490.03 |
| 8,175,747 B2 * | 5/2012 | Lee | ........................ | A63H 11/00 318/568.11 |
| 8,425,620 B2 * | 4/2013 | Johnson | .................... | A61F 2/76 623/24 |
| 8,453,533 B2 * | 6/2013 | Ryland | ................... | B08B 9/045 74/490.05 |
| 9,297,712 B2 * | 3/2016 | Freshour | ................. | G01L 3/108 |
| 9,321,172 B2 * | 4/2016 | Johnson | .................... | B25J 9/08 |
| 9,358,687 B2 * | 6/2016 | Emami | ..................... | B25J 9/08 |
| 9,827,682 B2 * | 11/2017 | Adachi | ................... | B25J 9/108 |
| 10,035,261 B2 * | 7/2018 | Johnson | ................. | B25J 9/0009 |
| 2004/0058765 A1 * | 3/2004 | Kubein-Meesenburg | .................. | F16G 13/20 474/206 |
| 2012/0024091 A1 * | 2/2012 | Kawabuchi | .............. | B25J 18/06 74/37 |
| 2013/0068061 A1 * | 3/2013 | Yoon | ...................... | B25J 18/025 74/490.05 |
| 2016/0375591 A1 * | 12/2016 | Yoon | .................... | H02G 11/006 74/490.05 |
| 2017/0266819 A1 * | 9/2017 | Yoon | ........................ | B25J 18/02 |
| 2017/0291311 A1 * | 10/2017 | Yoon | ....................... | F16G 13/20 |
| 2017/0297205 A1 * | 10/2017 | Takase | ..................... | B25J 19/06 |
| 2017/0320218 A1 * | 11/2017 | Yoon | ...................... | B25J 18/02 |
| 2018/0093383 A1 * | 4/2018 | Yoon | ...................... | B25J 18/02 |
| 2018/0207812 A1 * | 7/2018 | Yoon | ...................... | B25J 18/02 |
| 2018/0272544 A1 * | 9/2018 | Yoon | ...................... | F16G 13/20 |
| 2018/0361597 A1 * | 12/2018 | Yoon | ..................... | B25J 18/025 |
| 2019/0030734 A1 * | 1/2019 | Yoon | ................. | F16H 19/0645 |
| 2019/0032757 A1 * | 1/2019 | Yoon | ..................... | F16H 19/02 |
| 2019/0032758 A1 * | 1/2019 | Yoon | ................. | F16H 19/0645 |
| 2019/0054613 A1 * | 2/2019 | Shibata | ...................... | B25J 9/06 |

FOREIGN PATENT DOCUMENTS

| | | |
|---|---|---|
| JP | S58-120490 A | 7/1983 |
| JP | 2012-223081 A | 11/2012 |
| JP | 5435679 B2 | 3/2014 |
| JP | 2015-123570 A | 7/2015 |
| WO | 2015/137171 A1 | 9/2015 |

OTHER PUBLICATIONS

Written Opinion of International Searching Authority issued in PCT/JP2017/012209 dated Jun. 13, 2017 (4 pages).

Notice of Reasons for Refusal issued in Japanese Patent Application No. 2018-509286 dated Feb. 18, 2020 English Translation (6 pages).

* cited by examiner

ROBOT ARM MECHANISM AND ROTARY JOINT APPARATUS

CROSS-REFERENCE TO RELATED APPLICATIONS

This application is a continuation application of International Patent Application No. PCT/JP2017/012209 filed on Mar. 26, 2017, which is based upon and claims the benefit of priority from the prior Japanese Patent. Application No. 2016-066897, filed Mar. 29, 2016 the entire contents of which are incorporated herein by reference.

FIELD

Embodiments described herein relate generally to a robot arm mechanism and a rotary joint apparatus.

BACKGROUND

Conventionally, articulated robot arm mechanisms are used in various fields such as the field of industrial robots. The present inventors achieved practical application of a linear extension and retraction mechanism. The linear extension and retraction mechanism is a structure that makes an elbow joint unnecessary and realizes the elimination of singular points, and is thus a structure that will be extremely useful from now on.

The linear extension and retraction mechanism is constituted by a plurality of flat-plate shaped pieces (first pieces) that are bendably connected and a plurality of pieces having an inverted C-shaped groove shape (second pieces) that are similarly bendably connected on a bottom side, and a columnar arm section that is made linearly rigid and has a certain rigidity is constituted by these two types of pieces joining together. The arm section is supported in a state in which the arm section is sandwiched firmly and movably to front and rear by a plurality of rollers arranged on the top, bottom, left and right of a support body (roller unit). A drive gear is disposed to the rear of the rollers, and is meshed with a linear gear provided in the inner face of the first pieces. When the drive gear that is connected to a motor rotates forward, the arm section in the shape of a columnar body is sent out to the front from the support body, and when the drive gear rotates backward, the arm section is pulled back toward the rear. The first pieces and second pieces are separated in an area between the rollers and the drive gear, and return from the rigid state to a bent state. The support body is fixed to a rotating section of the up/down section.

Because the load of the arm section, a wrist section, an end effector and a work and the like is applied to the up/down section, it is necessary to perform not only regular maintenance of the up/down section, but to also perform unscheduled maintenance of the up/down section as appropriate. The up/down section is composed of a large number of constituent elements such as a fixed section, a rotating section which is rotatably supported by the fixed section, a motor and a gearbox that rotationally drive the rotating section, a structure that fixes the roller unit to the fixed section, and a structure that guides the second pieces between the roller unit and a columnar support section. Consequently, a large amount of man-hours are required to perform maintenance.

CITATION LIST

Patent Literature

[Patent Literature 1] Japanese Patent No. 5435679

SUMMARY OF INVENTION

Technical Problem

A purpose of the present invention is to reduce the number of maintenance man-hours required for maintenance of an up/down section in a robot arm mechanism.

Solution to Problem

In a robot arm mechanism according to the present embodiment, a columnar support section having a turning rotary joint is supported on a base, an up/down section having an upward/downward rotary joint is mounted on the columnar support section, a linear extension and retraction mechanism including an arm section having linear elasticity is provided in the up/down section, a wrist section to which an end effector is attachable is mounted at a tip of the arm section, and at least one rotary joint for changing a posture of the end effector is mounted in the wrist section. The arm section includes a plurality of first pieces having a plate shape that are bendably connected, and a plurality of second pieces having an inverted C-shape or hollow square shape in transverse section that are bendably connected on a bottom face side. When the first pieces are joined to the second pieces on a surface side that is opposite to the bottom face side, the first pieces and second pieces are formed into a columnar body whose bending is restricted and which is made rigid, and the first pieces and second pieces are returned to a bent state when the first pieces and second pieces are separated from each other. The up/down section includes: a pair of side frames that are mounted on a rotating section of the turning rotary joint; a cylindrical body that is supported in an axially rotatable manner by the side frames; a motor unit including a motor and a gearbox for rotationally driving the cylindrical body; a connecting section for connecting with an arm support body of the linear extension and retraction mechanism that movably supports the arm section; and a guide structure that guides the second pieces that are separated from the first pieces into the columnar support section. The motor unit, the connecting section and the guide structure are integrated with the cylindrical body. The motor unit is housed inside the cylindrical body, and an output shaft of the motor unit is connected to one of the side frames. The connecting section is fixed to an outer circumferential surface of the cylindrical body. The guide structure is an annular body that is provided on the outer circumferential surface of the cylindrical body.

DETAILED DESCRIPTION

Hereinafter, a rotary joint apparatus according to the present embodiment is described with reference to the accompanying drawings. Here, a robot arm mechanism equipped with the rotary joint apparatus according to the present embodiment will be described as an example. Although in this case a vertical articulated-type robot arm mechanism equipped with a linear extension and retraction mechanism is described as the robot arm mechanism, the robot arm mechanism may be of another type.

Figure 1:
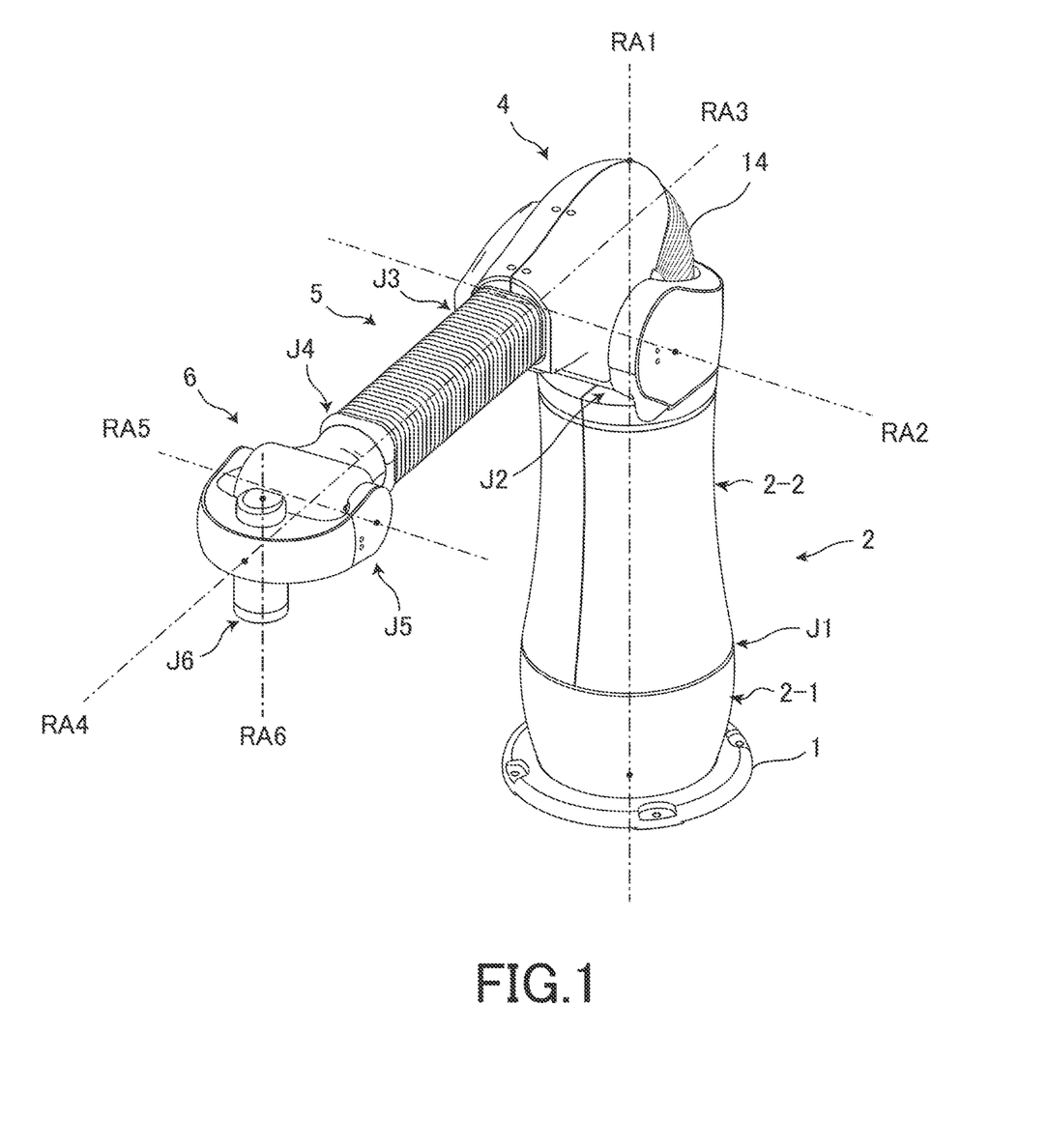
FIG. 1 is an external perspective view of a robot arm mechanism according to the present embodiment.
Figure 2:
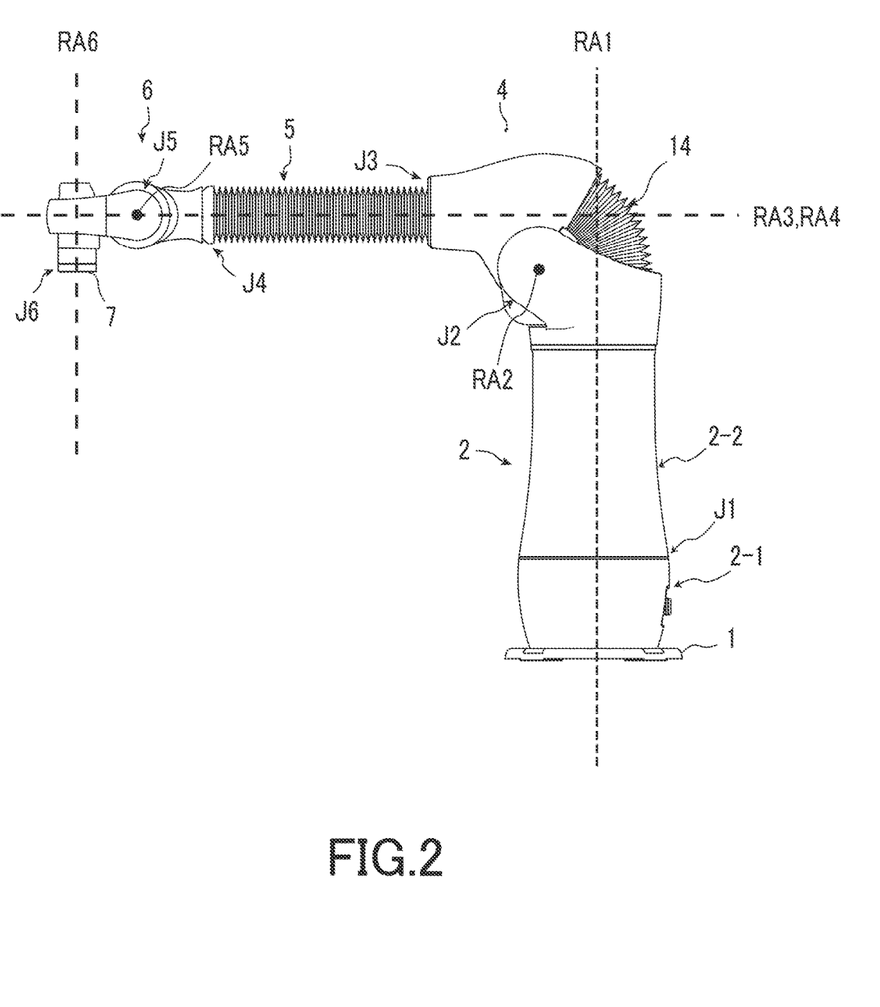
FIG. 2 is a side view of the robot arm mechanism shown in FIG. 1.
Figure 3:
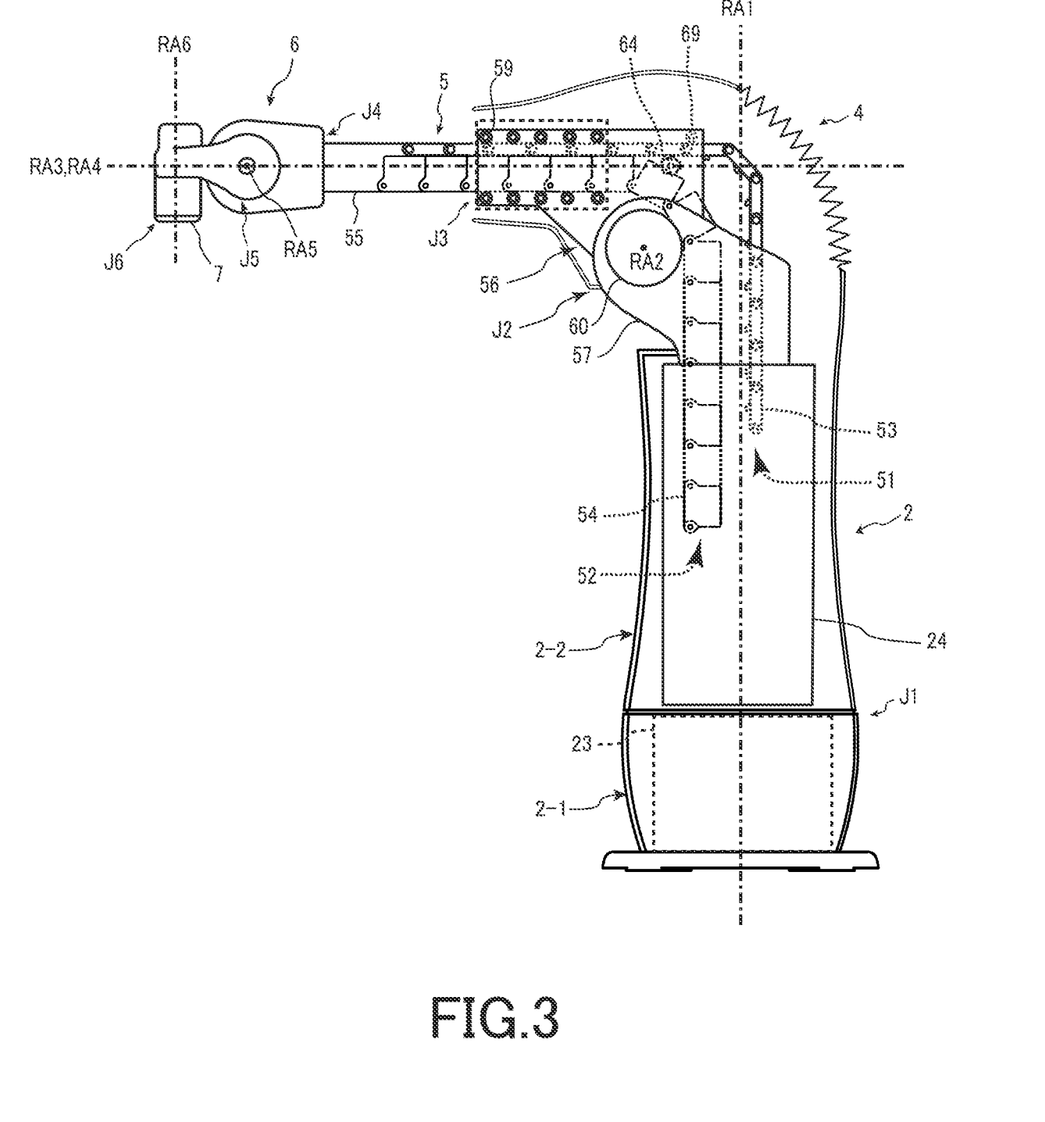
FIG. 3 is a view illustrating an internal structure of the robot arm mechanism in FIG. 1, which is a cross section view.
Figure 4:
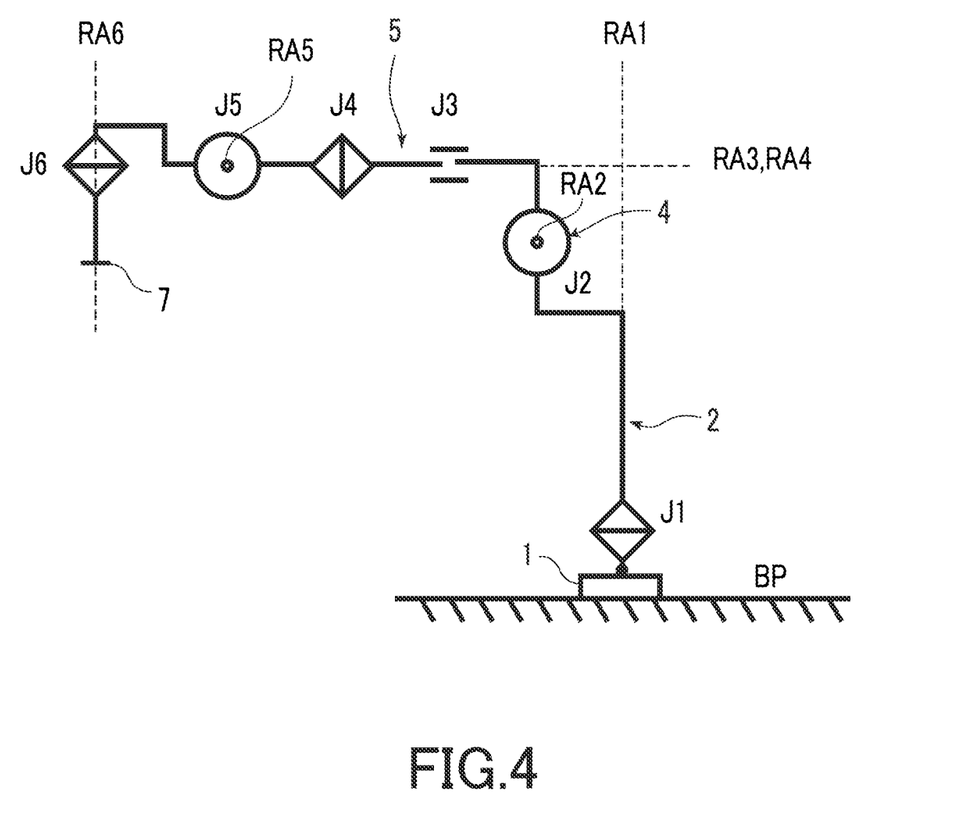
FIG. 4 is a view illustrating the configuration of the robot, arm mechanism in FIG. 1 by representation with graphic symbols.

FIG. 1 is a perspective view of a vertical articulated-type robot arm mechanism equipped with the rotary joint apparatus of the present embodiment, FIG. 2 is a side view thereof, and FIG. 3 is a side view of the robot arm mechanism from which a side-face cover has been detached. FIG. 4 is a view illustrating the configuration of joints of the robot arm mechanism by representation with graphic symbols. The rotary joint apparatus according to the present embodiment is applied to an upward/downward rotary joint of a second joint J2. A columnar support section 2 forming a cylindrical body is typically installed vertically on a base 1 of the robot arm mechanism. The columnar support section 2 houses a first joint J1 as a turning rotary joint. The first joint J1 has a torsional axis of rotation RA1. The axis of rotation RA1 is parallel to the vertical direction. The arm section 5 turns horizontally by rotation of the first joint J1. The columnar support section 2 includes a lower part 2-1 and an upper part 2-2. The lower part 2-1 is connected to a fixed section of the first joint J1. The column upper part 2-2 is connected to a rotating section of the first joint J1, and axially rotates on the axis of rotation RA1. First and second piece strings of the third joint J3 as a linear extension and retraction mechanism that is described later are housed in an inner hollow of the columnar support section 2 that forms a cylindrical body. An up/down section 4 that houses a second joint J2 as an upward/downward rotary joint is installed in the upper part 2-2 of the columnar support section 2. The second joint J2 is a bending rotation joint. The axis of rotation RA2 of the second joint. J2 is perpendicular to the axis of rotation RA1. The second joint J2 is installed in the upper part 2-2 of the columnar support section 2. The arm section 5 rotates upward and downward vertically by rotation of the second joint J2.

The third joint J3 is provided by a linear extension and retraction mechanism. Although described in detail later, the linear extension and retraction mechanism is equipped with a structure that was newly developed by the present inventors, and is clearly distinguished from a so-called previous "linear motion joint" from the viewpoint of the movable range thereof. Although the arm section 5 of the third joint J3 is bendable, the bending is restricted when the arm section 5 is sent out in the forward direction from a sending-out mechanism 56 that is a root of the arm section 5 along a center axis (extension and contraction center axis RA3), and linear rigidity is secured. Bending of the arm section 5 is restored when the arm section 5 is pulled back in the rearward direction. The arm section 5 has a first piece string 51 and a second piece string 52. The first piece string 51 includes a plurality of first pieces 53 that are bendably connected. The first pieces 53 are formed in a substantially flat plate shape. The second piece string 52 includes a plurality of second pieces 54. Each second piece 54 forms a groove-like body having an inverted C-shape in transverse section. The second pieces 54 are bendably connected by a connecting shaft of a bottom plate. Bending of the second piece string 52 is restricted at positions at which end faces of side plates of the second pieces 54 butt against each other. At such positions, the second piece string 52 is linearly arranged. A leading first piece 53 of the first piece string 51 and a leading second piece 54 of the second piece string 52 are connected by a head piece 55. For example, the head piece 55 has a shape that integrates the first piece 53 and the second piece 54.

The first and second piece strings 51 and 52 are pressed together and joined when passing between a plurality of rollers 59 that are vertically arranged in the sending-out mechanism 56. As a result of being joined, the first and second piece strings 51 and 52 manifest linear rigidity, and thereby constitute the prismatic arm section 5. A drive gear 64 is provided to the rear of the rollers 59 of the sending-out mechanism 56. The drive gear 64 is connected to a stepping motor through a decelerator (unshown). A linear gear is formed along the connecting direction at the width center of an inside face of the first piece 53. The linear gears which are adjacent when a plurality of the first pieces 53 are linearly aligned are connected linearly to constitute a long linear gear. The drive gear 64 is meshed with the linear gear of the first piece 53 that is pressed by a guide roller 69. The linear gears that are connected linearly constitute a rack-and-pinion mechanism together with the drive gear 64. When the drive gear 64 rotates forward, the first and second piece strings 51 and 52 are sent forward from the sending-out mechanism 56. When the drive gear 64 rotates backward, the first and second piece strings 51 and 52 are pulled back to the rear. The first and second piece strings 51 and 52 that were pulled back are separated between the rollers 59 and the drive gear 64. The separated first and second piece strings 51 and 52 each return to a bendable state. The first and second piece strings 51 and 52 that returned to a bendable state both bend in the same direction (inward) and are vertically housed inside the columnar support section 2. At this time, the first piece string 51 is housed in a substantially aligned state approximately parallel to the second piece string 52.

A wrist section 6 is attached to the tip of the arm section 5. The wrist section 6 includes fourth to sixth joints J4 to J6. The fourth to sixth joints J4 to J6 have three axes of rotation RA4 to RA6 that are orthogonal, respectively. The fourth joint J4 is a torsional rotation joint that rotates on the fourth axis of rotation RA4 that approximately matches the extension and contraction center axis RA3. An end effector is oscillatingly rotated by rotation of the fourth joint J4. The fifth joint J5 is a bending rotation joint that rotates on the fifth axis of rotation RA5 perpendicular to the fourth axis of rotation RA4. The end effector is tilted and rotated to front and rear by rotation of the fifth joint J5. The sixth joint J6 is a torsional rotation joint that rotates on the sixth axis of rotation RA6 perpendicular to the fourth axis of rotation RA4 and the fifth axis of rotation RA5. The end effector is axially rotated by rotation of the sixth joint J6.

The end effector is mounted to an adaptor 7 that is provided at a lower part of the rotating section of the sixth joint J6 of the wrist section 6. The end effector is a portion that has a function that allows the robot to directly act on a work object (work), and for example various tools exist in accordance with a required task, such as a gripping portion, a vacuum suction portion, a nut fastening tool, a welding gun, and a spray gun. The end effector is moved to a given position by the first, second and third joints J1. J2 and J3, and is disposed in a given posture by the fourth, fifth and sixth joints J4, J5 and J6. In particular, the length of the extension and retraction distance of the arm section 5 of the third joint J3 allows the end effector to reach objects in a wide range from a position close to the base 1 to a position far from the base 1. Characteristic features of the third joint J3 with respect to which the third joint J3 differs from a conventional linear motion joint are the linear extension and retraction motions realized by the linear extension and retraction mechanism constituting the third joint J3, and the length of the extension and retraction distance thereof.

The first joint J1 has a cylindrical or annular rotary pedestal 23. The rotary pedestal 23 is connected to the base 1 of the columnar support section 2. A rotary frame 24 that is rotatably supported on the rotary pedestal 23 is a cylindrical or annular shape. The first and second piece strings 51 and 52 that were pulled back are housed in an inner hollow of the rotary frame 24. A rotary shaft of an unshown motor is connected directly or indirectly through a motive power transmission mechanism to the rotary frame 24.

A pair of side frames 57 as a fixed section (support body) of the second joint J2 are mounted on the rotary frame 24. A cylindrical body 60 as a rotating section is rotatably supported by the pair of side frames 57. A motor unit that includes a motor and a gearbox is fixed inside the cylindrical body 60. An output shaft (drive shaft) of the motor unit is fixed to the other side frame 57. The cylindrical body 60 rotates on the axis of rotation RA2 accompanying rotation of the output shaft.

Figure 5A:
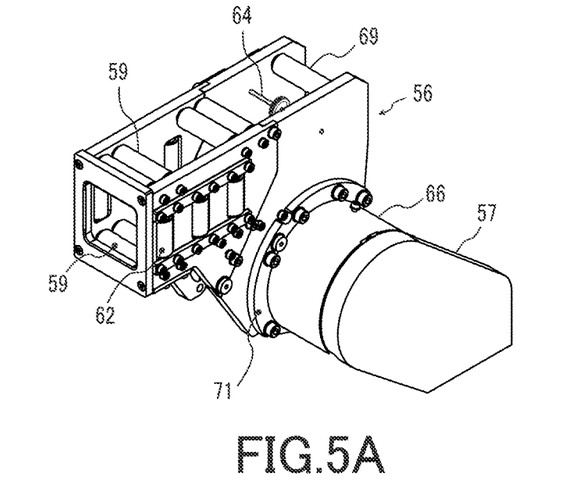
FIGS. 5A and 5B are perspective views illustrating the structure of an up/down section shown in FIG. 1.
Figure 5B:
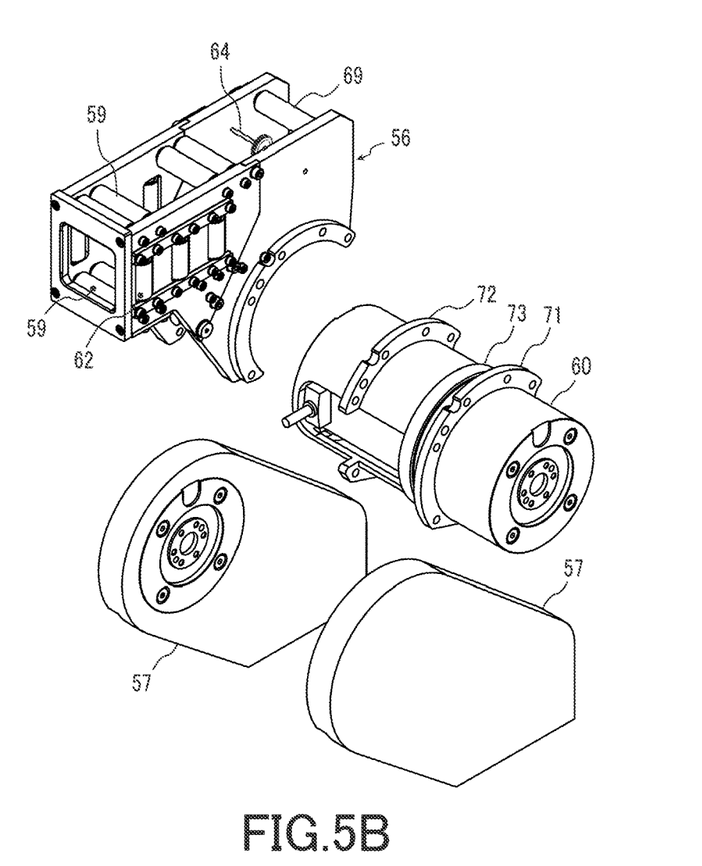

As illustrated in FIGS. 5A to 5B, the sending-out mechanism 56 is mounted on the peripheral surface of the cylindrical body 60. The sending-out mechanism 56 rotates accompanying axial rotation of the cylindrical body 60, and the arm section 5 that is supported by the sending-out mechanism 56 rotates upward and downward. The sending-out mechanism 56 includes a plurality of upper and lower rollers 59, a plurality of unshown left and right rollers, a drive gear 64, and a guide roller 69. Together with the first and second piece strings 51 and 52, the sending-out mechanism 56 is a main structure of the linear extension and retraction mechanism (third joint J3). For example, four upper and lower rollers 59 are provided, with two of the rollers 59 arranged on the upper side and the remaining two rollers 59 arranged on the lower side. The two rollers 59 that are on the upper side and lower side, respectively, are arranged in a line so that their axes of rotation are parallel with each other. The two rollers 59 on the upper side are separated from the two rollers 59 on the lower side by a distance that is equivalent to the total thickness of the joined first and second pieces 53 and 54. By this means, the first and second pieces 53 and 54 can be joined, firmly sandwiched from the top and bottom, and supported movably to front and rear by the upper and lower rollers 59. For example, six left and right rollers are provided, with three of the rollers arranged on the left side and the remaining three rollers arranged on the right side. The three rollers that are on the left side and right side, respectively, are linearly arranged in parallel with each other in a direction perpendicular to the axis of rotation. The three rollers on the left side are separated from the three rollers on the right side by a distance that is equivalent to the width of the first and second pieces 53 and 54. By this means, the first and second pieces 53 and 54 are firmly sandwiched from the left and right sides, and supported movably to front and rear.

In the present embodiment, by adopting a configuration in which a motor unit of the up/down section 4, a connection structure for connecting with the sending-out mechanism 56, and a guide structure for the second pieces 54 are integrated with the rotating section (cylindrical body) 60, it is possible to conduct maintenance with respect to the cylindrical body 60, the motor unit of the up/down section 4, the connection structure for connecting with the sending-out mechanism 56, and the guide structure for the second pieces by merely detaching the cylindrical body 60 from the side frames 57, thereby realizing an improvement in the maintenance properties. That is, in a case where the cylindrical body 60, the motor unit of the up/down section 4, the connection structure for connecting with the sending-out mechanism 56, and the guide structure for the second pieces 54 are individually attached to the side frames 57, when maintenance is required for any one of these components, for example, the motor unit, in order to take out the motor unit it is necessary to not only detach the cylindrical body 60 and the motor unit of the up/down section 4 from the side frames 57, but to also detach the connection structure and guide structure from the side frames 57, and in such a case where the maintenance properties are extremely poor.

Figure 6A:
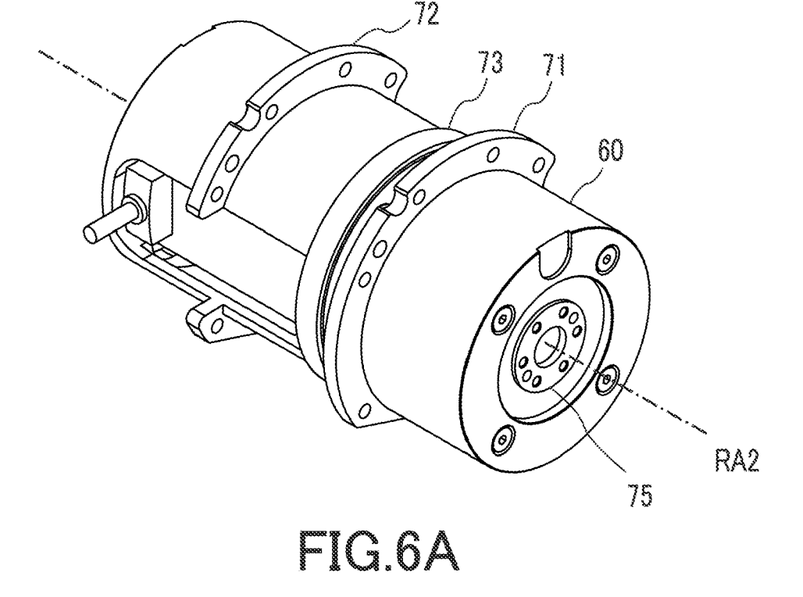
FIGS. 6A and 6B are perspective views illustrating the structure of a cylindrical rotating section shown in FIGS. 5A and 5B.
Figure 6B:
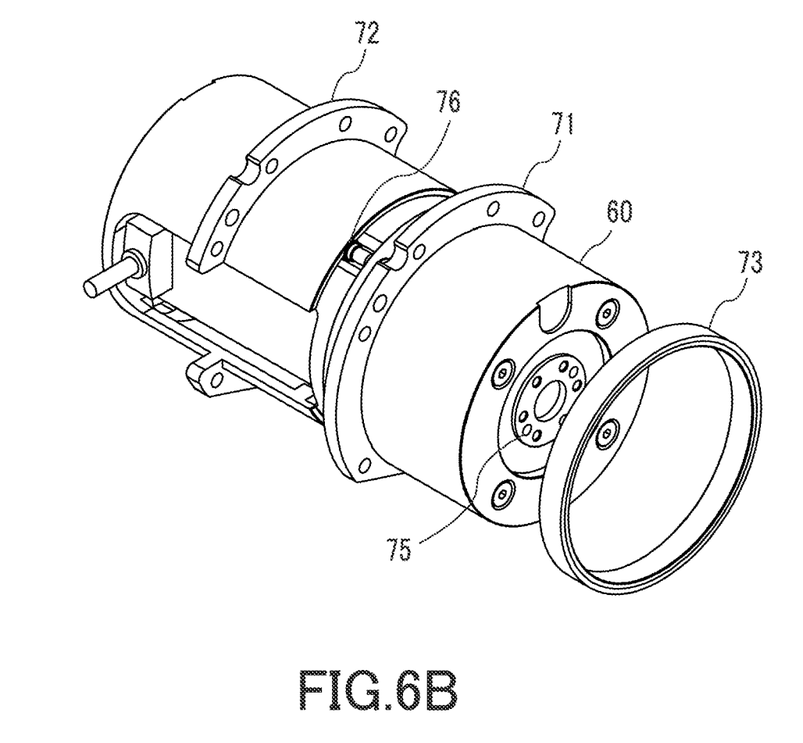
Figure 7A:
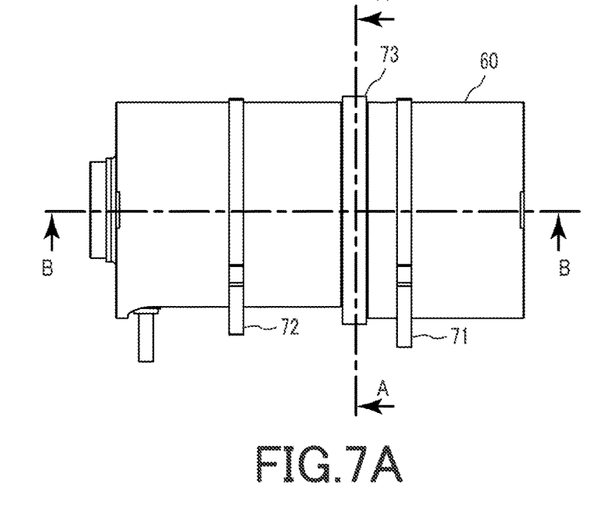
FIGS. 7A, 7B, and 7C are a side view, a transverse sectional view, and a longitudinal sectional view illustrating the structure of the cylindrical rotating section shown in FIGS. 5A and 5B.
Figure 7B:
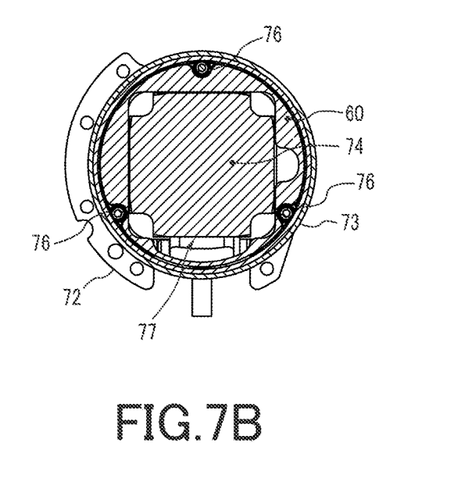
Figure 7C:
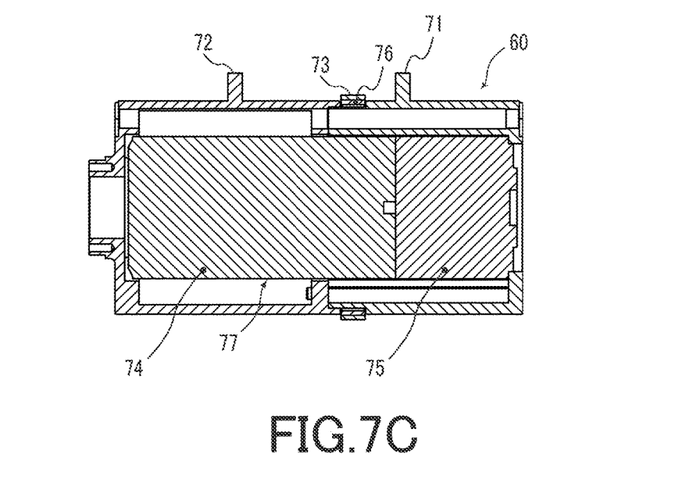

FIGS. 6A and 6B are perspective views illustrating the structure of the cylindrical body 60. FIG. 7A is a side view of the cylindrical body 60. FIG. 7B is a transverse sectional view along a line A-A in FIG. 7A. FIG. 7C is a longitudinal sectional view along a line B-B in FIG. 7A. As illustrated in FIGS. 6A and 6B and FIGS. 7A to 7C, a pair of connecting sections 71 and 72 that each have a semi-circular are shape as a connection structure for connecting with the sending-out mechanism 56 are firmly attached to the outer circumference of the cylindrical body 60 in a manner in which the connecting sections 71 and 72 are separated by a distance that corresponds to the width of the sending-out mechanism 56.

Figure 8:
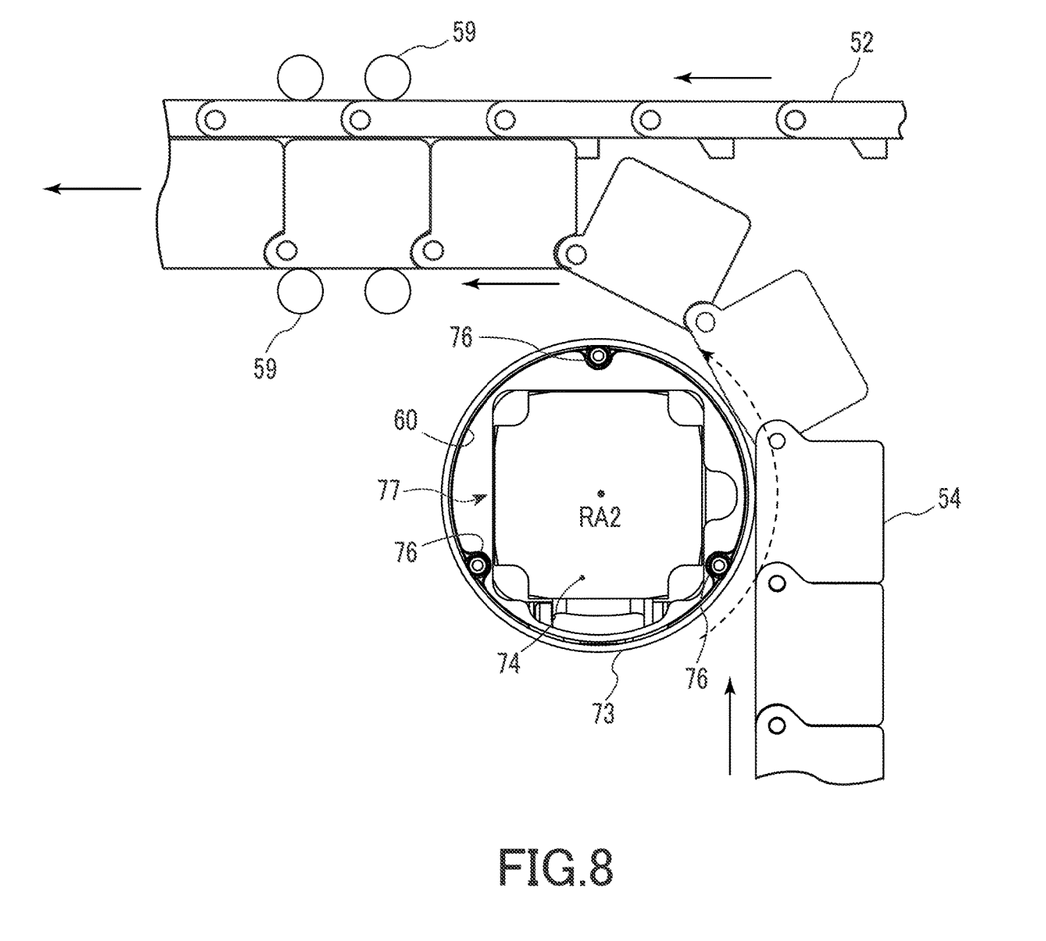
FIG. 8 is a side view illustrating the manner in which the cylindrical rotating section shown in FIGS. 5A and 5B guides the second pieces.

As illustrated in FIG. 8, the outer circumferential surface of the cylindrical body 60 is also used as the guide structure for the second pieces 54, and in this case, an annular body (guide wheel) 73, in particular, is provided in a manner such that the annular body 73 is freely rotatable via a plurality of, in this case, three, rollers 76 that are dispersively disposed at the outer circumference of the cylindrical body 60. The rollers 76 and the guide wheel 73 are disposed between the pair of connecting sections 71 and 72. To suppress the occurrence of damage or the like to the second pieces 54, preferably the guide wheel 73 is composed of a material, for example, resin, that has a lower hardness than the second pieces 54. Instead of the guide wheel 73, the guide structure for the second pieces 54 may be a sliding belt that is made of a self-lubricating resin such as polyacetal (POM), polyamide (PA) or polytetrafluoroethylene (PTFE; fluorocarbon resin) which is fixed to the outer circumference of the cylindrical body 60. In such a case, the second pieces 54 slide over the sliding belt and are guided into the inside of the columnar support section 2.

A motor unit 77 composed of a motor 74 and a gearbox 75 is housed inside the cylindrical body 60. The motor unit 77 is fixed to the cylindrical body 60 inside the cylindrical body 60. An output shaft 78 of the motor unit 77 is connected to one of the side frames 57. Because the motor unit 77 is fixed to the cylindrical body 60, and the output shaft 78 is connected to one of the side frames 57, when the output shaft. 78 of the motor unit 77 rotates, the motor unit 77 rotates and the cylindrical body 60 also rotates in accompaniment therewith.

By attaching the connecting sections 71 and 72 which are connected to the sending-out mechanism 56 to the outer circumferential surface of the cylindrical body 60, housing the motor unit 77 inside the cylindrical body 60, and utilizing the outer circumferential surface of the cylindrical body 60 as a guide structure for the second pieces 54 and providing the guide wheel 73 in a freely rotatable manner on the outer circumference of the cylindrical body 60 in this way, the integration of these components is realized. As described above, the integration of the aforementioned components improves the maintenance properties. In addition, the aforementioned integration also decreases the size of the up/down section 4.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

1 . . . BASE, 2 . . . COLUMNAR SUPPORT SECTION, 4 . . . UP/DOWN SECTION, 5 . . . ARM SECTION, 6 . . . WRIST SECTION, J1, J2, J4, J5, J6 . . . ROTARY JOINT, J3 . . . LINEAR EXTENSION AND RETRACTION JOINT (LINEAR EXTENSION AND RETRACTION MECHANISM), 53 . . . FIRST PIECE, 54 . . . SECOND PIECE, 56 . . . SENDING-OUT MECHANISM, 57 . . . SIDE FRAME, 59, 62 . . . ROLLER, 60 . . . CYLINDRICAL BODY, 64 . . . DRIVE GEAR, 69 . . . GUIDE ROLLER, 71, 72 . . . CONNECTING SECTION, 73 . . . GUIDE WHEEL, 75 . . . GEARBOX, 76 . . . ROLLER, 77 . . . MOTOR UNIT, 78 . . . OUTPUT SHAFT.

The invention claimed is:

1. A robot arm mechanism in which a columnar support section having a turning rotary joint is supported on a base, an up/down section having an upward/downward rotary joint is mounted on the columnar support section, a linear extension and retraction mechanism comprising an arm section having linear elasticity is provided in the up/down section, a wrist section to which an end effector is attachable is mounted at a tip of the arm section, and at least one rotary joint for changing a posture of the end effector is mounted in the wrist section, wherein:

the arm section comprises:
a plurality of first pieces having a plate shape that are bendably connected, and
a plurality of second pieces having an inverted C-shape or hollow square shape in transverse section that are bendably connected on a bottom face side, with the first pieces and second pieces being formed into a columnar body whose bending is restricted and which is made rigid when the first pieces are joined to the second pieces on a surface side that is opposite to the bottom face side, and the first pieces and second pieces being returned to a bent state when the first pieces and second pieces are separated from each other;

the up/down section comprises:
a pair of side frames that are mounted on a rotating section of the turning rotary joint,
a cylindrical body that is supported in an axially rotatable manner by the side frames,
a motor unit including a motor and a gearbox for rotationally driving the cylindrical body,
a connecting section for connecting with an arm support body of the linear extension and retraction mechanism that movably supports the arm section, and
a guide structure that guides the second pieces that are separated from the first pieces into the columnar support section;

the motor unit, the connecting section and the guide structure are integrated with the cylindrical body;
the motor unit is housed inside the cylindrical body, and an output shaft of the motor unit is connected to one of the side frames;
the connecting section is fixed to an outer circumferential surface of the cylindrical body; and
the guide structure is an annular body that is provided on the outer circumferential surface of the cylindrical body.

2. The robot arm mechanism according to claim 1, wherein the annular body is supported in a freely rotatable manner on the cylindrical body.

3. The robot arm mechanism according to claim 1, wherein the annular body is a sliding belt which is mounted on the outer circumferential surface of the cylindrical body and which causes the second pieces to slide.

4. A rotary joint apparatus, comprising:
a fixed section;
a cylindrical body that is supported in an axially rotatable manner by the fixed section;
a motor unit including a motor and a gearbox for rotationally driving the cylindrical body; and
a linear extension and retraction mechanism connected to an outer circumferential surface of the cylindrical body,
wherein:
the motor unit is integrated with the cylindrical body; an
the motor unit is housed inside the cylindrical body, and an output shaft of the motor unit is connected to the fixed section,
wherein the linear extension and retraction mechanism comprises:
a plurality of first pieces that are bendably connected; and
a plurality of second pieces that are bendably connected, and
wherein:
the first pieces and second pieces are formed into a columnar body whose bending is restricted and which is made rigid, when the first pieces are joined to the second pieces;
the first pieces and second pieces are returned to a bent state, when the first pieces and second pieces are separated from each other; and
the second pieces separated from the first pieces is guided to the outer circumferential surface of the cylindrical body.

\* \* \* \* \*